(12) United States Patent
Singhal et al.

(10) Patent No.: US 9,117,030 B2
(45) Date of Patent: Aug. 25, 2015

(54) SYSTEM AND METHOD TO PREDICT ELAPSED RESPONSE TIME FOR A QUERY DURING APPLICATION DEVELOPMENT STAGE

(71) Applicant: Tata Consultancy Services Limited, Mumbai, Maharashtra (IN)

(72) Inventors: Rekha Singhal, Maharashtra (IN); Manoj Karunakaran Nambiar, Maharashtra (IN)

(73) Assignee: Tata Consultancy Services Limited, Mumbai, Maharashtra (IN)

( * ) Notice: Subject to any disclaimer, the term of this patent is extended or adjusted under 35 U.S.C. 154(b) by 0 days.

(21) Appl. No.: 14/105,305

(22) Filed: Dec. 13, 2013

(65) Prior Publication Data

US 2015/0067646 A1    Mar. 5, 2015

(30) Foreign Application Priority Data

Sep. 2, 2013    (IN) .................. 2853/MUM/2013

(51) Int. Cl.
*G06F 9/44* (2006.01)
*G06F 11/36* (2006.01)
*G06Q 10/04* (2012.01)

(52) U.S. Cl.
CPC ............ *G06F 11/3696* (2013.01); *G06Q 10/04* (2013.01)

(58) Field of Classification Search
CPC ............ G06F 11/3409; G06F 11/3419; G06F 11/3447; G06F 11/3696; G06Q 10/04

USPC .................................................. 717/127–135
See application file for complete search history.

(56) References Cited

U.S. PATENT DOCUMENTS

| | | | |
|---|---|---|---|
| 6,795,817 | B2 | 9/2004 | Agarwal et al. |
| 6,799,175 | B2 | 9/2004 | Aggarwal |
| 7,155,428 | B1 * | 12/2006 | Brown et al. ..................... 707/4 |
| 7,246,111 | B1 * | 7/2007 | Chaware et al. ............. 707/718 |
| 7,895,192 | B2 | 2/2011 | Mehta et al. |
| 8,244,715 | B2 | 8/2012 | Cole et al. |
| 2010/0082602 | A1 | 4/2010 | Ganapathi et al. |

OTHER PUBLICATIONS

Singhal, "A Framework for Predicting Query Response Time", Jun. 2012, HPCC-ICESS, 2012 IEEE 14th International Conference, 10 pages.*

(Continued)

*Primary Examiner* — Ted T Vo
(74) *Attorney, Agent, or Firm* — Hayes Soloway, PC

(57) ABSTRACT

A system, method and computer program product to predict elapsed response time of a query during an application stage is disclosed. The query is executed over a database and is classified based on a mode of access of the database by the query. The database is emulated to obtain an emulated database. After classification, an access pattern of the database by the query along with one or more parameters is determined. By applying a classification specific technique over the access pattern and the one or more parameters, an input-access time of the query on the emulated database is then calculated to determine the elapsed response time of the query.

16 Claims, 6 Drawing Sheets

(56) References Cited

OTHER PUBLICATIONS

Jeff Maresh, "In defense of full-table scans", Jul. 2010, retrieved from https://web.archive.org/web/20100703012521/http://searchoracle.techtarget.com/tip/in-defense-of-full-table-scans, 11 pages.*

Jennie Duggan, Ugur Cetintemel, Olga Papaemmanouil and Eli Upfal, "Performance Prediction for Concurrent Database Workloads", Jun. 2011, ACM, 12 pages.

* cited by examiner

SYSTEM AND METHOD TO PREDICT ELAPSED RESPONSE TIME FOR A QUERY DURING APPLICATION DEVELOPMENT STAGE

CROSS REFERENCE TO RELATED APPLICATION

This application claims benefit of Indian Patent Application No. 2853/MUM/2013, filed on Sep. 2, 2013, the entirety of which is hereby incorporated by reference.

FIELD OF THE INVENTION

The invention in general relates to a system and method to predict an elapsed response time for a query. More particularly, the system and method relates to a system and method to predict the disk access response time for the query during an application development stage.

BACKGROUND OF THE INVENTION

In the database application development environment, during the application development stage, an important factor is query retrieval time while testing the application. After the application is developed, it's tested to check for all the necessary results over various databases. Execution of query and its response time is very much dependent on a database size. Database size is rather one of the most important factors that affects the query response time. Further, the query response time is drastically affected with the growing size of the database. Thus it is very important to predict and check for the elapsed response time of a query for the large size databases. The database size may have a negative affect the performance of an application.

Various load generation tools are commercially available to provide a solution with respect to query elapsed response time during an application development stage and for the varying size of the database. The most commonly followed approach uses a fraction of database to test the application. Many a times, resource associated problems also affects the process of testing. Large and powerful storage servers are required to store huge mass of data and records required for the testing. With these huge records, data loading is also one of the commonly faced problems.

Thus it becomes important to provide a solution by which testing may be done without consuming additional resources and in lesser time.

SUMMARY OF THE INVENTION

This summary is provided to introduce aspects related to systems and methods to predict an elapsed response time for a query during an application development stage and the aspects are further described below in the detailed description. This summary is not intended to identify essential features of the claimed subject matter nor is it intended for use in determining or limiting the scope of the claimed subject matter.

A system to predict an elapsed response time for a query during an application development stage is disclosed. The system comprises of a processor and a memory coupled to the processor. The processor is capable of executing a plurality of modules stored in the memory. The plurality of modules comprises of a query execution module configured to execute the query over a database, an emulation module configured to emulate the database in order to obtain an emulated database, a classification module configured to classify the query based upon a mode of access of the database by the query and a parameter determination module configured to determine, an access pattern along with one or more parameters with respect to the small size database. The access pattern and the parameters are sensitive to a size of the database. The modules further comprises of a computational module configured to calculate an input-output access time for the query on the emulated database by using a classification specific technique over the access pattern and the one or more parameters and to determine the elapsed response time of the query for the emulated database by using the input-output access time for varying size of the database.

A method to predict elapsed response time for a query during an application development stage is disclosed. The method comprises of executing the query over a database, emulating the database in order to obtain an emulated database, classifying the query so executed based upon a mode of access of the database by the query and determining an access pattern along with one or more parameters with respect to the size database. The access pattern and the parameters are sensitive to a size of the database. The method further comprises of, calculating an input-output access time for the query on the emulated database by using a classification specific technique over the access pattern and the one or more parameters and determining the elapsed response time for the query by using the input-output access time for varying size of the database. Wherein the executing, the classifying, the determining access pattern along with one or more parameters, the emulating, the calculating and the determining elapsed response time are performed by the processor.

A computer program product having embodied thereon a computer program to predict elapsed response time for a query during an application development stage is disclosed. The computer program product comprises of a program code executing the query over a small size database, a program code for emulating the database in order to obtain an emulated database, a program code classifying the query so executed based upon a mode of access of the database by the query and a program code determining an access pattern along with one or more parameters with respect to the small size database, wherein the access pattern and the parameters are sensitive to a size of the database. The computer program product further comprises of a program code calculating an input-output access time for the emulated database by using a classification specific technique over the access pattern and the one or more parameters and a program code determining the elapsed response time for the query by using the input-output access time for varying size of the database.

BRIEF DESCRIPTION OF DRAWINGS

The detailed description is described with reference to the accompanying figures. In the figures, the left-most digit(s) of a reference number identifies the figure in which the reference number first appears. The same numbers are used throughout the drawings to refer like features and components.

DETAILED DESCRIPTION

System, method and computer program product to predict elapsed response time for a query during an application development stage are disclosed. The query is first executed and the database is emulated. The query is then classified based on a mode of access of the database by the query. After the query is classified, access pattern of the database by the query along with one or more parameters are determined. The access pattern and the parameters are sensitive to size of the database and type of query and affect the query retrieval size with respect to growing size of the database. Input-output access time are calculated for the emulated database by applying a classification access technique over the access pattern and the one or more parameters to obtain an emulated database to later determine the query elapsed response time for the emulated database.

While aspects of described system and method to predict an elapsed response time for the query during an application development stage may be implemented in any number of different computing systems, environments, and/or configurations, the embodiments are described in the context of the following exemplary system.

Figure 1:
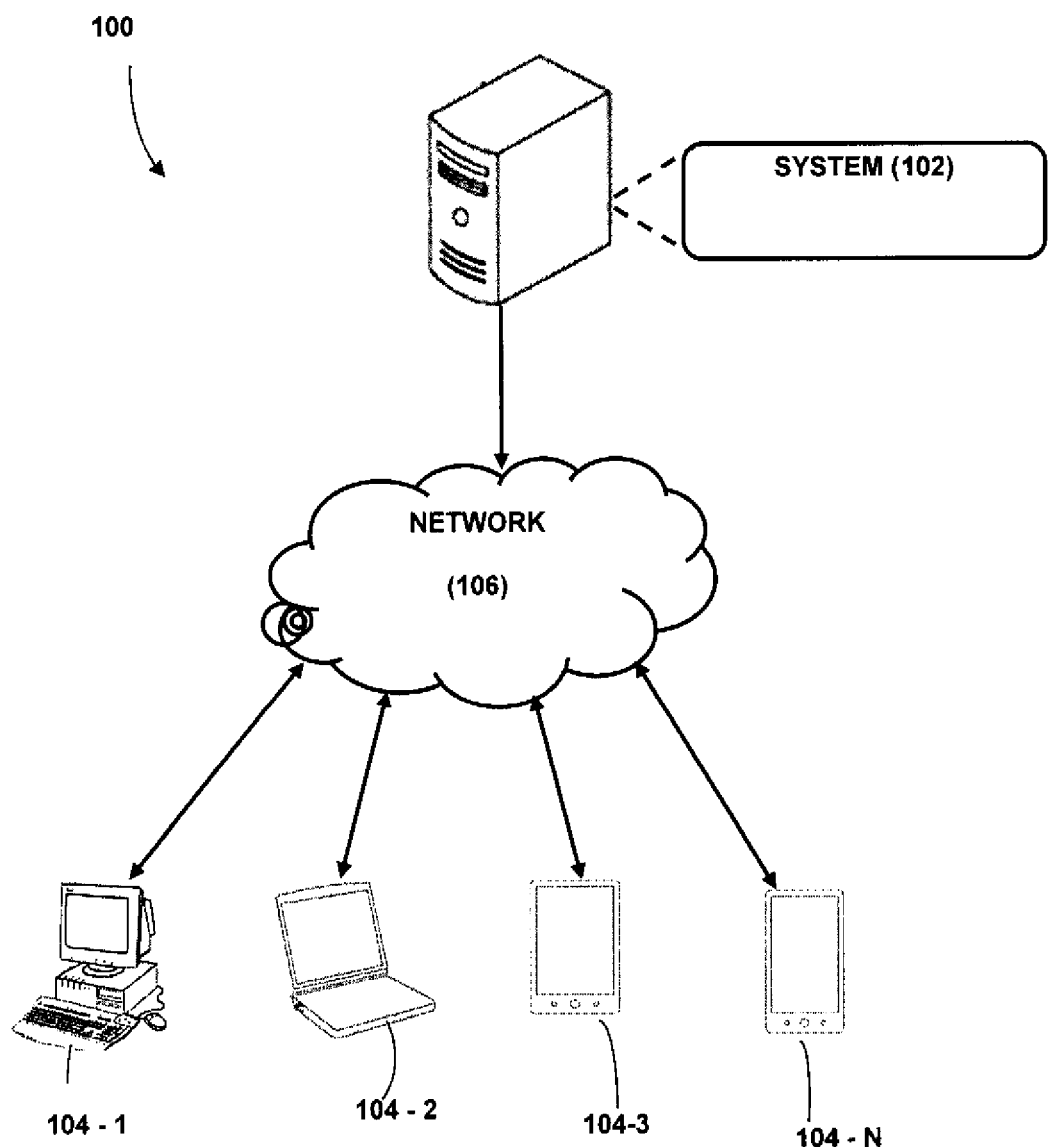
FIG. 1 illustrates the network implementation of the system in accordance with an embodiment of the invention.

Referring now to FIG. 1, a network implementation 100 of system 102 to predict an elapsed response time is illustrated, in accordance with an embodiment of the present subject matter. In one embodiment, the system 102 provides for prediction of elapsed response time of the query for a production database by emulating the production database. Using a small size database, various statistical parameters like access pattern of the database by the query and one or more parameters are determined. The access pattern and parameters are then used to emulate the production database to calculate the query response time.

Although the present subject matter is explained considering that the system 102 is implemented as an application on a server, it may be understood that the system 102 may also be implemented in a variety of computing systems, such as a laptop computer, a desktop computer, a notebook, a workstation, a mainframe computer, a server, a network server, and the like. It will be understood that the system 102 may be accessed by multiple users through one or more user devices 104-1, 104-2 . . . 104-N, collectively referred to as user 104 hereinafter, or applications residing on the user devices 104. Examples of the user devices 104 may include, but are not limited to, a portable computer, a personal digital assistant, a handheld device, and a workstation. The user devices 104 are communicatively coupled to the system 102 through a network 106.

In one implementation, the network 106 may be a wireless network, a wired network or a combination thereof. The network 106 can be implemented as one of the different types of networks, such as intranet, local area network (LAN), wide area network (WAN), the internet, and the like. The network 106 may either be a dedicated network or a shared network. The shared network represents an association of the different types of networks that use a variety of protocols, for example, Hypertext Transfer Protocol (HTTP), Transmission Control Protocol/Internet Protocol (TCP/IP), Wireless Application Protocol (WAP), and the like, to communicate with one another. Further the network 106 may include a variety of network devices, including routers, bridges, servers, computing devices, storage devices, and the like.

Figure 2:
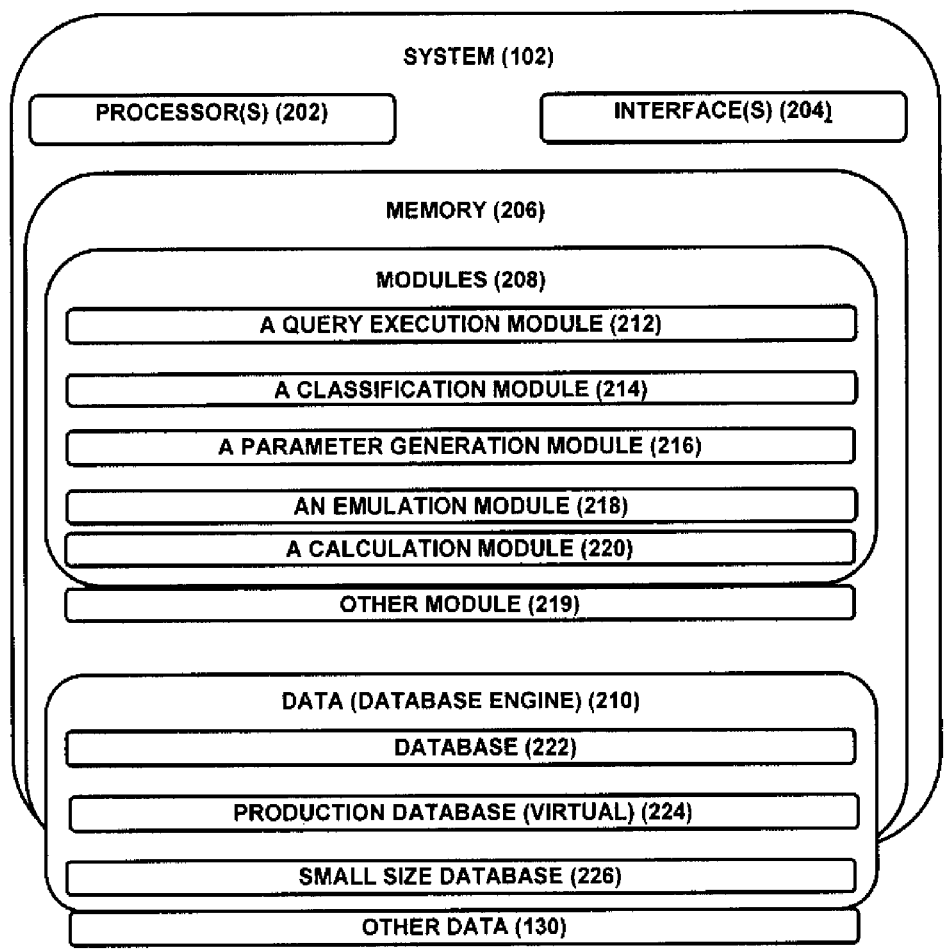
FIG. 2 illustrates various modules present in the system in accordance with an embodiment of the invention.
Figure 3:
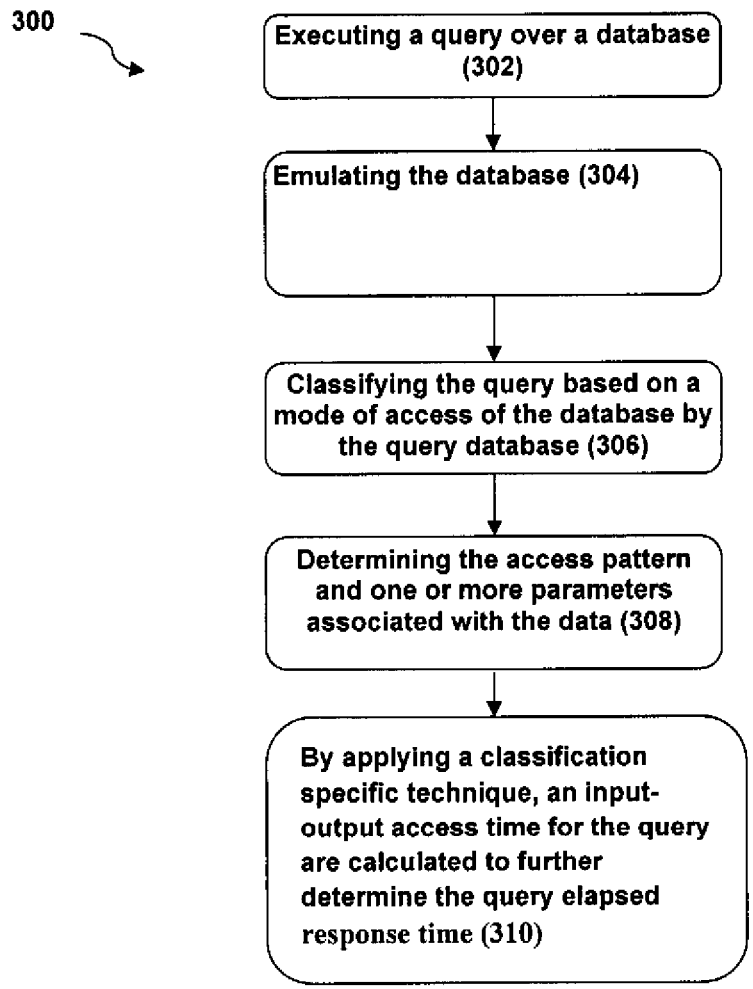
FIG. 3 illustrates the step wise methodology for predicting elapsed response time of the query in accordance with an embodiment of the invention.

Referring now to FIG. 2, the system 102 is illustrated in accordance with an embodiment of the present subject matter. In one embodiment, the system 102 may include at least one processor 202, an input/output (I/O) interface 204, and a memory 206. The at least one processor 202 may be implemented as one or more microprocessors, microcomputers, microcontrollers, digital signal processors, central processing units, state machines, logic circuitries, and/or any devices that manipulate signals based on operational instructions. Among other capabilities, the at least one processor 202 is configured to fetch and execute computer-readable instructions stored in the memory 206.

The I/O interface 204 may include a variety of software and hardware interfaces, for example, a web interface, a graphical user interface, and the like. The I/O interface 204 may allow the system 102 to interact with a user directly or through the client devices 104. Further, the I/O interface 204 may enable the system 102 to communicate with other computing devices, such as web servers and external data servers (not shown). The I/O interface 204 can facilitate multiple communications within a wide variety of networks and protocol types, including wired networks, for example, LAN, cable, etc., and wireless networks, such as WLAN, cellular, or satellite. The I/O interface 204 may include one or more ports for connecting a number of devices to one another or to another server.

The memory 206 may include any computer-readable medium known in the art including, for example, volatile memory, such as static random access memory (SRAM) and dynamic random access memory (DRAM), and/or non-volatile memory, such as read only memory (ROM), erasable programmable ROM, non-transitory memories, flash memories, hard disks, optical disks, and magnetic tapes. The memory 206 may include modules 208 and data 210.

The modules 208 include routines, programs, objects, components, data structures, etc., which perform particular tasks or implement particular abstract data types. In one implementation, the modules 208 may include a query execution module 212, an emulation module 214, classification module 216, a parameter determination module 218, and a computational module 220 other modules 219. The other modules 219 may include programs or coded instructions that supplement applications and functions of the system 102.

The data 210, amongst other things, serves as a repository for storing data processed, received, and generated by one or more of the modules 208. The data 210 (database engine) may also include a database 222, a production database 224 (virtually created), a small size database 226 and other data 130. The other data 130 may include data generated as a result of the execution of one or more modules in the other module 218.

In accordance with an embodiment, the system 102 is hosted on a database 222 server to avoid the time delays which may be introduced in the query result due to query processing time at a web server.

The query is first executed over a small size database 226 by means of a query execution module 212. The purpose of executing the query over the small size database is to collect a database statistics (small size database 226) so that a production database 224 may be emulated.

A database server such as oracle has two processes for executing a SQL query-SQL client to issue query to get result, and query server to parse query, fetch data from disk, process data and send it back to the client. The elapsed response time of a query shall include time spent at query server in processing and time to output data to the client.

It is observed using micro benchmarking tools on small size database that for a full table scan query, the query server accesses the data from the table as a sequence of sequential system read calls, each of size in multiples of database block. After each system read, the query server process the data including applying filter condition and preparing it for SQL client. The preparation of the data includes formatting of data and breaking it up into multiple packets each of size same as receiving buffer size defined at the client. It sends a prepared data packet to the client and then waits for the acknowledgement from the client before sending the next packet. It is further observe that a significant amount of time is spent at the query server before sending the first data packet, which we refer as 'data preparation time', however subsequent data packets are sent immediately on receiving the acknowledgement. The next system read call is not issued until all packets are sent to the client.

In case the data is accessed using an index (assuming Btree) the query processor traverses the index tree till it hits a leaf block. It accesses all qualified leaf blocks and the matching data blocks using data pointers in leaf nodes. Only required rows from the accessed data blocks are prepared and then sent to the client. In this case, each of the system read call or disk access including index tree, leaf node and data node is of database block size. Therefore, ERT (Elapsed Response Time) for index scan query is summation of:
1. Time taken to traverse the index tree till leaf nodes
2. Time to access qualified leaf nodes
3. Time taken to access all matching data blocks.
4. Total time spent in data preparation after each system read call.
5. Total time taken to send all data packets.
6. Total time spent in waiting to receive each acknowledgement from the client for the data packet sent, which may include time spent by client in formatting data before acknowledging the receipt.

The second and third steps are interleaved in different data access patterns. The leaf node blocks accesses are sequential in nature but these accesses are interleaved with data blocks accesses. For primary index scan the data blocks are accessed sequentially for each leaf node, however for non-primary index scan there may be many segments of sequential accesses.

After the query is executed by the query execution module 212, the database is emulated by the emulation module 214. The query is classified using a classification module 216. The classification is based on a mode of access of the database by the query. Data in a table is accessed by the query as full table scan, fast index full scan, index range scan using primary key or index range scan using non-unique key index. The query is classified depending on how the data is accessed during the query execution and amount of data returned back to the user.

The query on a table either reads all rows sequentially or selective rows using indexes in case of full table scan and index scan respectively; these are referred as full table scan query and index scan query respectively. In index scan query, selection depends on the filter condition given in the query (where clause). An index scan could be using index on primary key or secondary key which may be primary key of other table in the database; the former is referred as primary index scan query and the latter as non-unique index scan query respectively. A special case of index scan where a query's required data reside in index may read only index blocks even for full table output; this is referred as fast full index scan. In case of full table scan query, all table blocks are read and the filter, if present, is applied only post access to get selected rows/data, however in index scan only selected data blocks are read. After the table scan either full or index, the fetched data is processed using aggregate function, if any, before sending it to the user. Both the above mentioned features of a query impact the response time of the query with increase in size of the database. The impact of size of output data can be included post accessing the table.

Thus, the classification module 216 classifies the query based on the mode of access only.

The types of query classification are explained below:

Full Table Scan Query: All blocks of the table are accessed fully irrespective of the selection in the filter condition. Queries may return a single row as aggregated output or majority of the rows from the table.

Primary Index Scan Query: Only blocks which satisfy the filter condition are accessed using index on the primary key of the table. A query may return a single row as aggregated output, or majority of the rows from the table, while accessing data using index on primary key s_suppkey.

Non-unique Index Scan Query: Only blocks which satisfy the filter condition are accessed using index on the non-unique (secondary) key of the table, which may be primary key of another table. A query may return a single row as aggregated output or majority of the rows from the table, while accessing data using index on non-unique key s_nationkey.

Fast Index Scan: In case of index scan, data can be output either from index blocks or data blocks. In the former case, query does not need to access table blocks and output data only from index blocks.

For example, aggregate output of full table scan query is Select sum (s_acctbal) from supplier and full output for full table scan query is Select * from supplier. Whereas the aggregate output of fast index scan query is Select /*+index (pk_supp) */ sum (s_suppkey) from supplier where s_suppkey>3 and full output of index scan query is Select /*+index (pk_supp) */s_suppkey from supplier where s_suppkey>3

Therefore, from the above example, it is observed that one access mode differs from the other on the size of data read at a time and the relative addresses of data blocks read one after other. This is referred as data access pattern.

The system 102 then determines an access pattern along with one or more parameters with respect to the small size database. The access pattern, the parameters and the query are sensitive to a size of the database as well as the types of data access performed by a query which depends on the type of the query as classified by the patent.

In full table scan, the data size read varies from 64K to 1 MB, however in index scan the read data size is always 8k (if database block size is 8K).

In full table scan, the relative addresses are sequential in nature. However, in index scan, it is always read of one leaf node (block) followed by a series of data blocks and repeating this sequence thereafter. The leaf blocks are sequential to each other and the data blocks' relative addresses depend on the type of index scan.

The memory further stores a parameter determination module 218 configured to determine the access pattern of the database by the query along with one or more parameters with respect to the small size database 226. We call this access pattern and the parameters 'the database statistics'.

The classification specific technique is applied over the access pattern and the one or more parameters to determine an input-output access time for the emulated database.

Classification specific technique for full table scan query:

In the classification technique for full table scan query, the query, table schema Projected size of the table as S (or number of rows & average size of row are fed as an input. The computational module 220 then processes the input to calculate the input-output access time for the full table scan query.

The step wise details of the classification technique for table scan query is explained below:
1. Create a small database of size in few megabytes. Execute the query on the database and run micro benchmark tools to calculate the following:
   a. Size of data packet sent from query server to the client.
   b. Average time taken in data preparation.
   c. Average time for sending one data packet
   d. Average waiting time to receive acknowledgement for each data packet
2. Generate a file of size in multiples of table size "S" (to match it to DB file size).
3. Take starting address as random number closer to the beginning of the file. Generate the data access pattern as a sequence of system read calls which include size of data to read and location to read from. In full table scan, a system read call reads from the location sequential to the previous read call.
4. First, generate system read of size 8K at the starting address. This is followed by maximum four pairs of system read calls of sizes 64K and 56K if the file size is more than 484K (4*64K*56K). Decrease the file size by 484K i.e. S=S-484K. If S is larger than 1M then keep generating system read of size 1M and decrease S by 1M, until S reduces to less than 1M. Generate the last system read call of remaining size S.
5. Calculate number of system read calls of large size (approx. 1 MB or more).
6. Calculate the number of data packets for each system read call as size of read call divided by the size of data packet (as obtained from 1.a).

If the output is a single row as in case of query with aggregate functions, the read calls are executed one after another without any intermediate send and receive from client. All the rows are processed together using aggregate function and sends back as single row of output over the network to the client. Therefore, the network time is negligible. Similarly, a filter condition on full table scan also reduces the data communication between the client and the query server, thus leads to less network time. In this case, the total number of data packets could be calculated as linearly extrapolated output data size divided by the size of data packet.

7. Intersperse the system read calls with total delay defined by 1.b, 1.c and 1.d.
8. Play the above generated data access pattern on the generated file in step 2. The calculation module 220 then calculates the total time taken which corresponds to the 10 access time of the query.

Classification Specific Technique for Index Scan Query:

In case the data is accessed using an index (assuming Btree) the query processor traverses the index tree till it reaches a leaf block matching the filter condition such as key=val, where key is column of the table on which index has been created. Database server accesses all qualified leaf blocks one by one and the matching data blocks using data pointers in the leaf node after the access of each leaf node. Only required rows from the accessed data blocks are read, processed and prepared to send to the client. In this case, each of the system read call or disk access including index tree, leaf node and data node is of database block size. Therefore, input-output access time for index scan query is summation of:
1. Time taken to traverse the index tree till leaf nodes
2. Time to access qualified leaf nodes
3. Time taken to access all matching data blocks.
4. Network transfer time for output data.

The time contribution from step 3 is dependent on how the rows have been placed in the database. The leaf nodes of an index tree are stored in increasing order of the key values so the leaf blocks are accessed sequentially. Moreover, leaf blocks being part of the index structure, their access do not depend on how rows are arranged in the data blocks.

For a database with uniform data distribution and no deletion, a database will have sequential access of data blocks if addressed by the primary index on the key. For a non-unique index scan, the access to data blocks may be modeled as segments of sequential accesses. For fast index scan, there is sequential access of only leaf nodes and no data blocks are read.

The data access pattern can be generated using the number of leaf nodes, height of index tree and number of data blocks nodes; these statistics are available with a database. However, for a projected large size, the database does not exists, so these statistics are collected from a small sized physically existed database and are linearly extrapolated to match that of projected size. In index scan, the data read is read in size of database block size. Therefore, the different index scan differs in generation of location for each system read. The network IO access time can be calculated same as discussed for Full Table Scan.

Classification Specific Technique for Fast Index Scan Query:

Only leaf nodes are accessed and data is output from the index structure only.

In the classification specific technique for Fast Index Scan Query, the Query (with key<val, key<val and key=val), Table Schema, Size of the table or (number of rows & avg size of row) are fed as an input. The calculation module 220 processes the input to calculate the input-output access time.

Details of the classification specific technique are:
1. Create a small database of size in few megabytes. Get the following database statistics using DB specific tools- database block size (Bsize), minimum value of the indexed column (min), maximum value of the column (max), number of leaf nodes per key (Lsize) and height of the tree (Hsize). These database statistics are obtained for projected database size S by linearly extrapolating the obtained statistics.
2. Calculate the number of matched key values (MKV) as
   a. 1 for key=val
   b. (val−min) for key<val
   c. (max−val) for key oval
3. Total qualified leaf nodes, QL=Lsize*MKV.
4. Generate the data access pattern having sequence of size of offsets and starting addresses—all the offsets are of Bsize. First Hsize+1 system reads are generated each starting from a random address. This is followed by QL−1 sequential accesses.
5. Calculate the network parameters as discussed in Full Table Scan AFTS.6 and intersperse the system read calls with total delay obtained from AFTS.1.
6. Play the above generated data access pattern. Calculate the total time taken by using the calculation module 220, which corresponds to the input-output access time of the query.

Classification Specific Technique for the Primary Index Scan Query:

In case of primary index scan, a query with filter condition such as key=val, or key<val will always access constant number of leaf blocks and data blocks irrespective of the size of the table, therefore, the total number of block accesses will increase only with increase in height of the index tree, therefore, IO access time of such queries is invariant to table size. However, for queries with filter condition such as key>val, number of accessed data blocks may increase with increase in data size. Moreover, data blocks will be accessed in increasing order of their primary key and hence block addresses, i.e. data blocks access are not be repeated.

In the classification specific technique for Primary Index Scan Query, the Query (with key<val, key<val and key=val), Table Schema, Size of the table or (number of rows &avg size of row) are fed as an input. The input is then processed by the calculation module 220 to calculate the input-output access time.

Details of the classification specific technique for the Primary Index Scan Query are:
1. Create a small database of size in few megabytes. Get the following database statistics using DB specific tools- database block size (Bsize), minimum value of the indexed column (min), maximum value of the column (max), number of data blocks per key (Dsize), number of leaf nodes per key (Lsize) and height of the tree (Hsize). We get these database statistics for projected database size S by linearly extrapolating the obtained statistics.
2. These database statistics are obtained for projected database size S by linearly extrapolating the statistics obtained from step 1.
3. Calculate the number of matched key values (MKV) as
   a. 1 for key=val
   b. (val−min) for key<val
   c. (max−val) for key>val
4. Total qualified leaf nodes, QL=Lsize*MKV
5. Generate the data access pattern having sequence of size of offsets and starting addresses—all the offsets are of Bsize. First Hsize+1 system reads are generated each starting from a random address. This is followed by QL−1 sequential accesses interspersed with Dsizesequential accesses between two leaf nodes access. Starting block addresses for leaf and data blocks are different, so their addresses are random to each other.
6. Calculate the network parameters as discussed in Full Table Scan AFTS.6 and intersperse the system read calls with total delay obtained from AFTS.1.
7. Play the above generated data access pattern. Calculation module 220 then calculates the total time taken which corresponds to the input-output access time of the query.

Classification Specific Technique for Non-Unique Index Scan Query:

In case, the table is accessed using an index on non-unique key, the order of data blocks accesses depend on the data placement distribution in the table. Accessing a set of rows matching an indexed column value using a non-unique index may lead to accessing all blocks of the table if the values of the column are placed in uniform random distribution in rows in the table. An increasing deterministic order of value distribution of non-unique column maps to the data access pattern same as that with the primary key.

In case of non-unique key index scan, a query with filter condition such as key=val, may access more than one leaf and more than one data blocks, but the data blocks will be accessed in increasing order of their addresses. However, for queries with filter condition such as key>val, or key<val, a data block may get addressed more than once since, a data block has equal probability of having records of all key values due to uniform random distribution of the column values. This leads to repeated access of a data block. The repeated accesses may get serviced from the database cache, OS cache or storage device directly depending on the size of the accessed table and the caches.

For table size<database cache, repeated accesses are serviced from database cache.

For database cache<table size<OS cache, repeated accesses are serviced from OS cache.

For table size>OS cache, repeated accesses are serviced from hard disk.

In the classification specific technique for Non-unique index scan query, the Query (with key<val, key<val and key=val), Table Schema, Size of the table or (number of rows &avg size of row) are fed as an input. The input is then processed by the computational module 220 to calculate the input-output access time.

Details of the classification specific technique are:
1. Create a small database of size in few megabytes. Get the following database statistics using DB specific tools- database block size (Bsize), number of data pointers per leaf node (Dptr), minimum value of the indexed column (min), maximum value of the column (max), number of leaf nodes per key (Lsize) and height of the tree (Hsize). We get these database statistics for projected database size S by linearly extrapolating the obtained statistics.
2. These database statistics are obtained for projected database size S by linearly extrapolating the statistics obtained from step 1.
3. Calculate the number of matched key values (MKV) as
   a. 1 for key=val
   b. (val−min) for key oval
   c. (max−val) for key oval
4. Total qualified leaf nodes, QL=Lsize*MKV
5. Generate the data access pattern having sequence of size of offsets and starting addresses—all the offsets are of Bsize. First Hsize+1 system reads are generated each starting from a random address. This is followed by QL−1 sequential accesses interspersed with Dptrsequential accesses between two leaf node accesses. Starting block addresses for leaf and data blocks are different, so their addresses are random to each other. Repeat this step for MKV iterations for table size>database cache, however, keeping the same set of block addresses as generated in the first iteration.
6. Calculate the network parameters as discussed in Full Table Scan AFTS.6 and intersperse the system read calls with total delay obtained from AFTS.1.
7. Play the above generated data access pattern. The calculation module 220 then calculates the total time taken which corresponds to the input-output access time of the query.

The calculation module 220, then determines the elapsed response time (ERT) for the query by using the input-output access time.

The query ERT (Elapsed Response Time) on size 'S' for both full table scan query and index scan query as estimated by the computational module 220 is summation of:
1. Parsing time.
2. Total Time taken by all system read calls.
3. Total number of system read calls*Average data preparation time.
4. Total number of data packets*Average time taken to send the packet 5. Total number of data packets*Average waiting time to receive acknowledgement from the client.

By way of exemplary embodiment, let us consider a specific DB server, Oracle 11g, to explain the functioning of the system 102. Intel quad core server with 4 GB RAM is used. The database schema and data are generated using dbgen utility based on TPC-H[11] benchmarks. Results are obtained for five of the synthetic queries on supplier table, as listed below. These queries are formulated based on their mode of accessing the table. Queries where CPU computation time is linear with respect to size of database are chosen so that ERT may be calculated by adding the linearly extrapolated CPU time to the IO (Input-output) access time.

Synthetic queries on TCP-H Schema:
- Full Table Sean Query 1: select * from supplier (full output)
- Full Table Scan Query 2: select sum(s_acctbal) from supplier (aggregated output)
- Fast Index Scan Query 3: select /*+index(supplier pk_supplier) */s_suppkey from supplier
- Primary Index Scan Query 4: select /*+index(supplier pk_supplier) */sum(s_acctbal) from supplier where s_suppkey>10;
- Non-Unique Index Scan Query 5: select /*+index(supplier supp_nk) */sum(s_acctbal) from supplier where s_nationkey=3

The database consists of table supplier with indexes supp_nk and pk_supplier on fields s_nationkey and s_suppkey respectively. Please note that pk_supplier is a primary index created on the primary key s_suppkey and supp_nk is a non-unique index created on the foreign key s_nationkey. A small database of size 1.39M is created and all queries listed above are executed on the database. The micro benchmarks tools such as strace and tkprof are used to collect data required by algorithms AFTS, AFIS, APIS and ANUIS (as discussed above).

Figure 4:
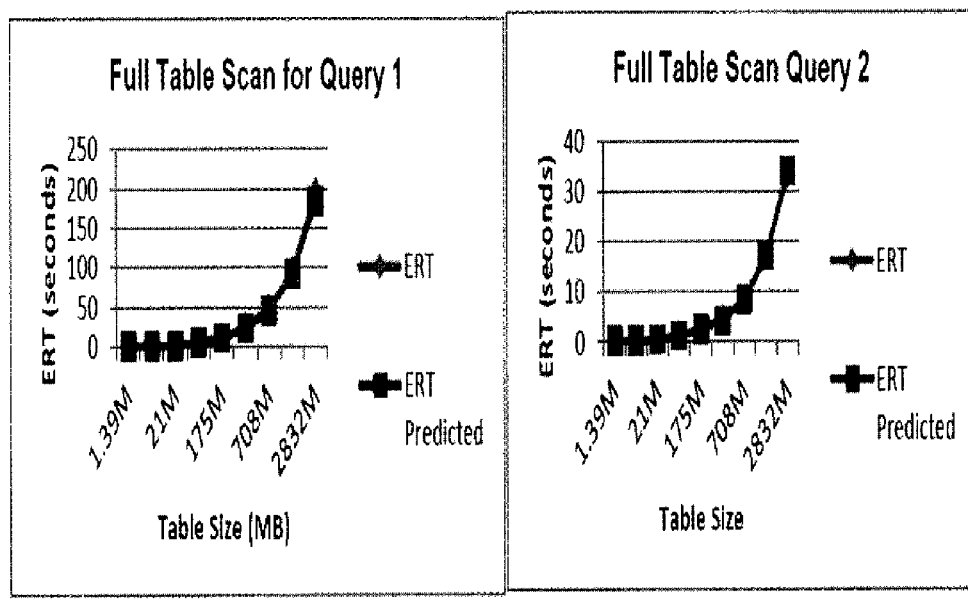
FIG. 4 illustrates the elapsed response time for a full table scan query in accordance with an exemplary embodiment of the invention.

The algorithm, AFTS, is applied on files for database of size 5.6M, 21M, 87M and 175M for queries 1 and 2 to get their estimated IO access time and hence elapsed response times by adding linearly extrapolated component of CPU time. It is further observed that query execution of 175M size leads to 95% large reads. Therefore, 175M is the small size, which is used to predict IO access time and hence ERT for queries 1 and 2 using linear extrapolation for database of size 354M, 708M, 1416M and 2832M. The results for queries 1 and 2 are presented in FIG. 4.

Figure 5:
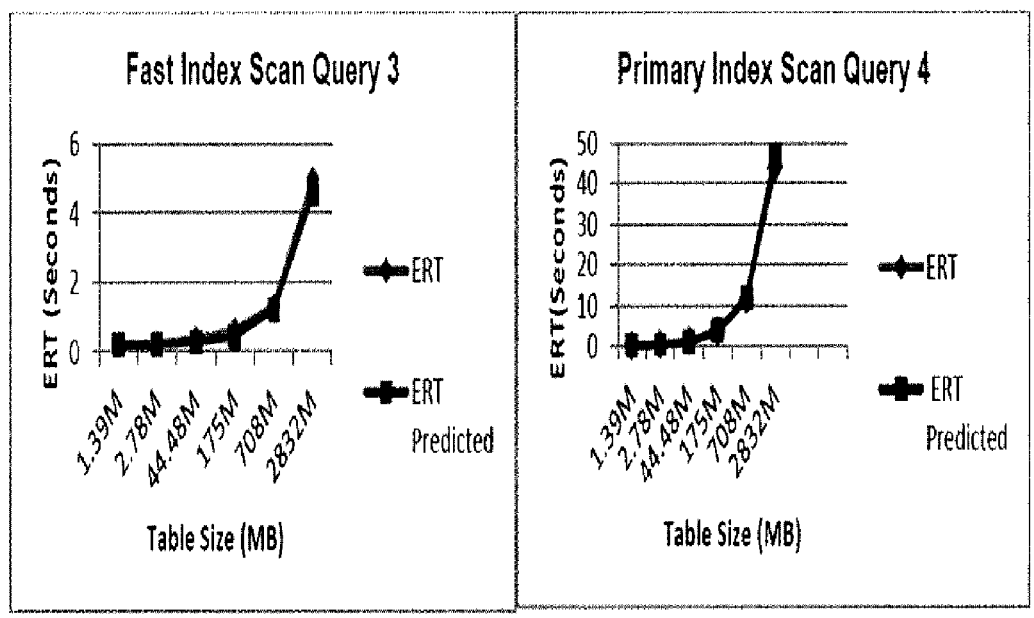
FIG. 5 illustrates the elapsed response time for a fast index and primary index scan query in accordance with an exemplary embodiment of the invention.
Figure 6:
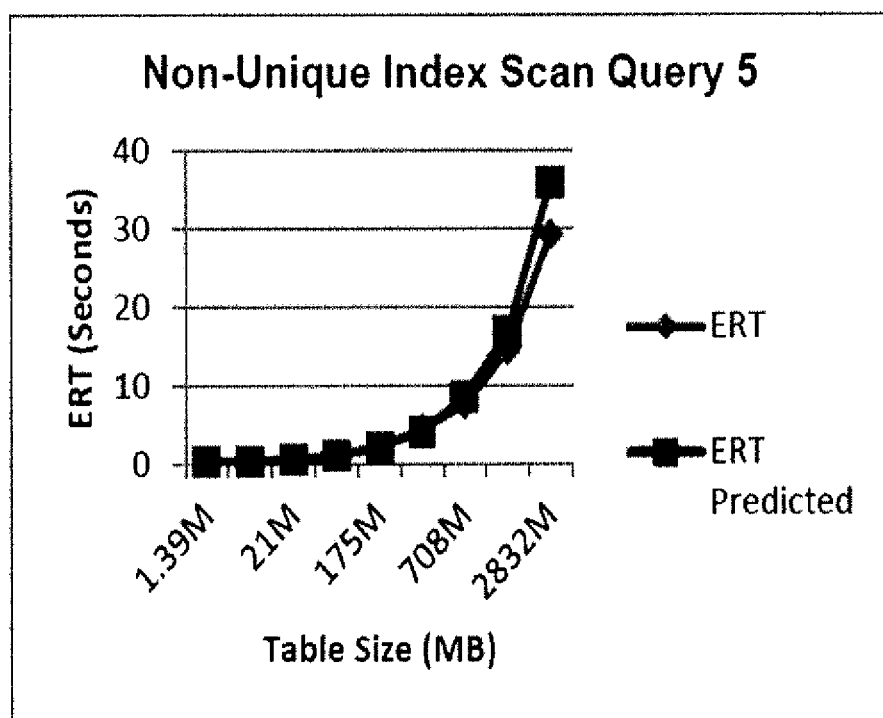
FIG. 6 illustrates the elapsed response time for a non-unique index scan query in accordance with an exemplary embodiment of the invention.

For index scan queries—query 3, 4 and query 5, the database of size 5.6M, 21M, 87M and 175M is emulated using linear extrapolation to get database statistics required by algorithm AFIS, APIS and ANUIS. The algorithm AFIS is applied for query 3 on database of size 5.6M, 21M, 87M and 175M. The algorithm APIS is applied for query 4 on database of size 5.6M, 21M, 87M and 175M. The query ERT for further larger DB sizes, from 354M to 2832M, is predicted using linear extrapolation from table size 175M. The algorithm ANUIS is used for query 5, to calculate the IO access time and hence ERT. The results for queries 3, 4 and 5 are presented in FIGS. 5 and 6.

The order in which the method 300 is described is not intended to be construed as a limitation, and any number of the described method blocks can be combined in any order to implement the method 300 or alternate methods. Additionally, individual blocks may be deleted from the method 300 without departing from the spirit and scope of the subject matter described herein. Furthermore, the method can be implemented in any suitable hardware, software, firmware, or combination thereof. However, for ease of explanation, in the embodiments described below, the method 300 may be considered to be implemented in the above described system 102.

At block 302, the query is executed over a database.

At block 304, the database is emulated.

At block 306, the query is classified based on a mode of access of the database by the query.

At block 308, an access pattern along with one or more parameters is determined.

At block 310, by applying a classification specific technique, an input-output access time for the query on the emulated database are calculated to further determine the query elapsed response time.

The written description describes the subject matter herein to enable any person skilled in the art to make and use the embodiments of the invention. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

We claim:

1. A system to predict elapsed response time for a query to be executed on a production database, the system comprising:
   a processor; and
   a memory coupled to the processor, wherein the processor is capable of executing instructions within a plurality of modules stored in the memory, and wherein the plurality of modules comprises:
   a query execution module configured to execute the query over a database in order to collect database statistics;
   an emulation module configured to emulate the database statistics in order to obtain an emulated database, wherein the database statistics are emulated based on a production database;
   a classification module configured to classify the query into at least one of a full table scan query, a fast index scan query, a primary index scan query, and a non-unique index scan query, and wherein the query is classified based upon a mode of accessing the emulated database by the query;
   a parameter determination module configured to determine an access pattern along with at least one parameter of the emulated database, wherein the access pattern, the at least one parameter, and the query are sensitive to size of the emulated database; and
   a computational module configured to
      calculate an input-output access time of the query executed on the emulated database based on
         a classification specific technique corresponding to the at least one of the full table scan query, the fast index scan query, the primary index scan query, and the non-unique index scan query, and
         the at least one parameter; and
      determine an elapsed response time of the query to be executed on a production database based on addition of the input-output access time and a linearly extrapolated CPU time.

2. The system of claim 1, wherein the query is executed over the database having a size smaller than the production database.

3. The system of claim 1, wherein the at least one parameter comprises a table schema and a projected size of a table for each of the full table scan query, the fast index scan query, the primary index scan query and the non-unique index scan query.

4. The system of claim 1, wherein the emulation module is configured to extrapolate the access pattern along with the at least one parameter to obtain the emulated database.

5. The system of claim 1, wherein the emulated database further comprises an emulated large size database.

6. The system of claim 1, wherein the fast index scan query, the primary index scan query, and the non-unique index scan query further comprises a one leaf block followed by a series of data blocks, wherein each relative address of each data block, in the series of data blocks, depends on a type of index scan.

7. The system of claim 1, wherein the computational module adds a parsing time, a total time taken by all system read calls, a total number of system read calls multiplied by an average data preparation time, a total number of data packets multiplied by an average time taken to send the data packets, and the total number of data packets multiplied by an average waiting time to receive an acknowledgment from a client to determine the elapsed response time of the query.

8. The system of claim 7, wherein the computational module calculates the input-output access time, when the query is the full table scan query, by
creating the database of size smaller than the production database, wherein the database is created to execute the query, and wherein the query is executed to calculate size of data packet, average time taken in data preparation, average time for sending a data packet, and average waiting time to receive acknowledgement for each data packet;
generating a file of size in multiples of table size 'S';
taking a starting address as random number closer to a beginning of the file;
generating system read of a pre-defined size at the starting address;
calculating a number of system read calls of large size;
calculating the number of data packets for each system read call; and
interspersing the system read calls with total delay.

9. The system of claim 7, wherein the computational module calculates the input-output access time, when the query is the fast index scan query, by
creating the database of size smaller than the production database, wherein the database is created to determine the database statistics, and wherein the database statistics comprises block size (Bsize), minimum value of the indexed column (min), maximum value of the column (max), number of data blocks per key (Dsize), number of leaf nodes per key (Lsize), and height of the tree (Hsize);
calculating a number of matched key values (MKV);
determining total qualified leaf nodes by product of Lsize and MKV;
generating the data access pattern having sequence of size of offsets and starting addresses, wherein the offsets are of Bsize, and wherein Hsize+1 system reads are generated from a random address followed by QL−1 sequential accesses;
calculating network parameters; and
interspersing the system read calls with total delay.

10. The system of claim 7, wherein the computational module calculates the input-output access time, when the query is the primary index scan query, by
creating the database of size smaller than the production database, wherein the database is created to determine the database statistics, and wherein the database statistics comprises block size (Bsize), minimum value of the indexed column (min), maximum value of the column (max), number of data blocks per key (Dsize), number of leaf nodes per key (Lsize), and height of the tree (Hsize);
calculating a number of matched key values (MKV);
determining total qualified leaf nodes by product of Lsize and MKV;
generating the data access pattern having sequence of size of offsets and starting addresses, wherein the offsets are of Bsize, and wherein Hsize+1 system reads are generated from a random address, and wherein QL−1 sequential accesses interspersed with Dsize sequential accesses between two leaf nodes access;
calculating network parameters; and
interspersing the system read calls with total delay.

11. The system of claim 7, wherein the computational module calculates the input-output access time, when the query is the non-unique index scan query, by
creating the database of size smaller than the production database, wherein the database is created to determine the database statistics, and wherein the database statistics comprises block size (Bsize), minimum value of the indexed column (min), maximum value of the column (max), number of data blocks per key (Dsize), number of leaf nodes per key (Lsize), and height of the tree (Hsize);
calculating number of matched key values (MKV);
determining total qualified leaf nodes by product of Lsize and MKV;
generating the data access pattern having sequence of size of offsets and starting addresses, wherein the offsets are of Bsize, and wherein Hsize+1 system reads are generated from a random address, and QL−1 sequential accesses interspersed with Dptr sequential accesses between two leaf nodes access;
calculating network parameters; and
interspersing the system read calls with total delay.

12. A method to predict elapsed response time for a query to be executed on a production database, the method comprising:
executing the query over a database in order to collect database statistics;
emulating the database statistics in order to obtain an emulated database, wherein the database statistics are emulated based on a production database;
classifying the query into at least one of a full table scan query, a fast index scan query, a primary index scan query, and a non-unique index scan query, and wherein the query is classified based upon a mode of accessing the emulated database by the query;
determining an access pattern along with at least one parameter with respect to the emulated database, wherein the access pattern, the at least one parameter and the query are sensitive to size of the emulated database;
calculating an input-output access time for the query executed on the emulated database based on
a classification specific technique corresponding to the at least one of the full table scan query, the fast index scan query, the primary index scan query, and the non-unique index scan query and
the at least one parameter; and
determining an elapsed response time for the query to be executed on a production database based on addition of the input-output access time and a linearly extrapolated CPU time, whereby the steps of executing the query, classifying the query, determining the access pattern along with the at least one parameter, emulating the database, calculating the input-output access time, and determining the elapsed response time are performed by a processor executing instructions stored on a memory.

13. The method of claim 12, wherein the at least one parameter further comprises a table schema and a projected size of a table for each of the full table scan query, the fast index scan query, the primary index scan query and the non-unique index scan query.

14. The method of claim 12, wherein the access pattern and the at least one parameter are extrapolated to obtain the emulated database.

15. The method of claim 12, wherein the input-output access time further comprises a storage access time and a network transfer time, wherein the storage access time and the network transfer time are associated to the query.

16. A computer program product having a processor and a memory, embodied on the memory a computer program having program code executable by the processor to predict elapsed response time for a query to be executed on a production database, the computer program product comprising:
  a program code for executing the query over a database in order to collect database statistics;
  a program code for emulating the database statistics to obtain an emulated database, wherein the database statistics are emulated based on a production database;
  a program code for classifying the query into at least one of a full table scan query, a fast index scan query, a primary index scan query, and a non-unique index scan query, and wherein the query is classified based upon a mode of accessing the emulated database by the query;
  a program code for determining an access pattern along with at least one parameter of the emulated database, wherein the access pattern, the at least one parameter and the query are sensitive to size of the emulated database;
and
  a program code for calculating an input-output access time for the query executed on the emulated database based on
    a classification specific technique corresponding to the at least one of the full table scan query, the fast index scan query, the primary index scan query, and the non-unique index scan query and
    the at least one parameter; and
  a program code for determining the elapsed response time for the query to be executed on a production database based on addition of the input-output access time and a linearly extrapolated CPU.

* * * * *